(12) United States Patent
Badic et al.

(10) Patent No.: US 12,452,762 B2
(45) Date of Patent: Oct. 21, 2025

(54) ACCESS LOAD CONTROL IN PEER-TO-PEER NETWORKS

(71) Applicant: Apple Inc., Cupertino, CA (US)

(72) Inventors: Biljana Badic, Munich (DE); Babar Qaisrani, Issaquah, WA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 17/879,023

(22) Filed: Aug. 2, 2022

(65) Prior Publication Data

US 2023/0096571 A1    Mar. 30, 2023

Related U.S. Application Data

(60) Provisional application No. 63/249,403, filed on Sep. 28, 2021.

(51) Int. Cl.
*H04W 40/22* (2009.01)
*H04W 4/90* (2018.01)
*H04W 72/12* (2023.01)

(52) U.S. Cl.
CPC ........... *H04W 40/22* (2013.01); *H04W 72/12* (2013.01); *H04W 4/90* (2018.02)

(58) Field of Classification Search
CPC ..... H04W 40/22; H04W 88/04; H04W 72/12; H04W 72/1263; H04W 28/08; H04W 28/12; H04L 47/80; H04L 47/70; H04L 47/00
See application file for complete search history.

(56) References Cited

U.S. PATENT DOCUMENTS

| 7,363,382 B1 | 4/2008 | Bakke et al. |
| 11,012,874 B1 | 5/2021 | Ananth et al. |
| 2001/0023455 A1* | 9/2001 | Maeda .................... H04L 47/10 709/224 |

(Continued)

FOREIGN PATENT DOCUMENTS

| CN | 104509150 A | 4/2015 |
| CN | 110402599 A | 11/2019 |
| WO | WO-2021239135 A1 * | 12/2021 |

OTHER PUBLICATIONS

Liang J, Method and Device For Determining Priority, English Translation of WIPO (WO-202139135-A1)) (Year: 2024).*

(Continued)

*Primary Examiner* — Walter J Divito
(74) *Attorney, Agent, or Firm* — Fish & Richardson P.C.

(57) ABSTRACT

Implementations relate to identifying, by a relay device, a first message received from a first requesting device of a plurality of requesting devices; identifying, by the relay device, a second message received from a second requesting device of the plurality of requesting devices; determining, by the relay device based at least in part on a parameter of the first message, that the first message has a first priority level that satisfies a priority threshold; determining, by the relay device based at least in part on a parameter of the second message, that the second message has a second priority level that does not satisfy the priority threshold; transmitting a relay message to a remote device based at least in part on the first message; and transmitting a backoff message to the second requesting device.

22 Claims, 8 Drawing Sheets

(56) References Cited

U.S. PATENT DOCUMENTS

| | | | |
|---|---|---|---|
| 2005/0147056 A1* | 7/2005 | Chinitz | H04W 74/0875 370/310 |
| 2007/0287470 A1* | 12/2007 | Kirke | H04W 4/90 455/411 |
| 2010/0120392 A1 | 5/2010 | Youn et al. | |
| 2011/0117907 A1 | 5/2011 | Hooli et al. | |
| 2013/0083722 A1* | 4/2013 | Bhargava | H04W 52/245 455/10 |
| 2015/0172413 A1* | 6/2015 | Yoneda | H04L 67/63 709/233 |
| 2017/0289042 A1* | 10/2017 | Niemi | H04L 47/12 |
| 2018/0124633 A1* | 5/2018 | Hwang | H04W 76/00 |
| 2018/0192461 A1 | 7/2018 | Naik et al. | |
| 2020/0394851 A1 | 12/2020 | Lee et al. | |
| 2021/0136659 A1 | 5/2021 | Ianev et al. | |
| 2021/0266917 A1* | 8/2021 | Damnjanovic | H04W 72/569 |
| 2023/0098700 A1 | 3/2023 | Badic et al. | |

OTHER PUBLICATIONS

[No Author Listed] "3rd Generation Partnership Project; Technical Specification Group Core Network and Terminals; Non-Access-Stratum (NAS) protocol for 5G System (5GS); Stage 3; (Release17)," 3GPP TS 24.501 V17.4.1, Sep. 27, 2021, 863 pages.

[No Author Listed] "3rd Generation Partnership Project; Technical Specification Group Core Network and Terminals; Proximity-services (ProSe) in 5G System (5GS) protocol aspects; Stage 3 (Release 17)," 3GPP TS 24.554 V0.4.0, Sep. 10, 2021, 209 pages.

Extended European Search Report in European Appln No. 22193184.3, dated Feb. 23, 2023, 14 pages.

Nokia et al., "Impact of NAS level congestion control for 5G ProSe UE-to-Network Relay," 3GPP TSG-CT WG1 Meeting #131-e E-meeting, CL-214314, Aug. 19-27, 2021, 10 pages.

Apple, "KI#3, Sol #7: Updated for support of IMS Emergency Services over L2 relay," SA WG2 Meeting #141E, S2-2007730, Oct. 12-23, 2020.

* cited by examiner

ACCESS LOAD CONTROL IN PEER-TO-PEER NETWORKS

CROSS-REFERENCE TO RELATED APPLICATIONS

The present application claims the benefit of U.S. Provisional Application No. 63/249,403, filed on Sep. 28, 2021 entitled "Access Load Control In Peer-To-Peer Networks," which is herein incorporated by reference in its entirety.

BACKGROUND

Direct communication with a network may be unavailable at times and relay communications through another device can be important. However, in high-usage situations, congestion may impact the ability to relay communications.

SUMMARY

In general, some aspects of the subject matter described in this specification can be embodied in methods that include the actions of identifying, by a relay device, a first message received from a first requesting device of a plurality of requesting devices; identifying, by the relay device, a second message received from a second requesting device of the plurality of requesting devices; determining, by the relay device based at least in part on a parameter of the first message, that the first message has a first priority level that satisfies a priority threshold; determining, by the relay device based at least in part on a parameter of the second message, that the second message has a second priority level that does not satisfy the priority threshold; transmitting a relay message to a remote device based at least in part on the first message; and transmitting a backoff message to the second requesting device.

In general, some aspects of the subject matter described in this specification can be embodied in methods that include the actions of generating, based at least in part on a user input, a message related to the electronic device; transmitting the message to a relay device; and identifying, based at least in part on the message, a response message received from the relay device. The response message received from the relay device can be a high priority response message if the relay device determines that the message has a high priority level. The response message received from the relay device can be a backoff message if the relay device determines that the message has a priority level that is different than a high priority level.

In general, some aspects of the subject matter described in this specification can be embodied in methods that include the actions of identifying an event disrupting connectivity to a first network; determining that the apparatus has a connection to a second network; transmitting a message indicating to one or more neighboring devices that the apparatus has network connectivity; receiving a first relay request from a first device and a second relay request from a second device; forwarding, using the connection to the second network, a message associated with the first relay request; and transmitting, to the second device, a backoff message.

In general, some aspects of the subject matter described in this specification can be embodied in methods that include the actions of advertising that the apparatus has network connectivity to at least one destination; receiving two or more request messages, each of the two or more request messages received from a corresponding device of two or more requesting devices that does not include the at least one destination, where the two or more request messages includes one or more first request messages and one or more second request messages; selecting, from the two or more request messages and using corresponding priorities, the one or more first request messages; forwarding, using the network connectivity and to a corresponding destination from the at least one destination, the one or more first request messages; and transmitting, to each device in a subset of devices from the two or more requesting devices, a backoff message, wherein each second request message from the one or more second request messages was received from a device in the subset of devices.

A system can be configured to perform operations or actions by virtue of having software, firmware, hardware, or a combination thereof installed on the system that in operation causes or cause the system to perform the operations or actions. One or more computer programs can be configured to perform operations or actions by virtue of including instructions that, when executed by data processing apparatus, cause the apparatus to perform the operations or actions. The operations or actions performed either by the system or by the instructions executed by data processing apparatus can include the methods of any one of the described implementations.

The foregoing and other embodiments can each optionally include one or more of the following features, alone or in combination. The first message can be related to a first emergency situation. The second message can be related to a second emergency situation. The first situation and the second situation can be the same situation or different situations. The first message can include a first status message. The second message can include a second status message.

In some implementations, the method can include transmitting, by the relay device based at least in part on the first message or the second message, a request to a remote device. The remote device can include a remote device of an emergency service. The high priority response message can include a request to establish a communication link between the first requesting device and the relay device. The high priority response message can include a request for more information from the first requesting device. The high priority response message or the backoff message can include an indication that the relay device sent a message to a remote system. The backoff message can include an indication of a duration until the second requesting device can transmit another message to the relay device.

In some implementations, the parameter of the first message can be at least one of a message type of the first message, an identity of a user of the first requesting device, a proximity of the first requesting device to the relay device, or a signal quality parameter of the first requesting device. The signal quality parameter can be reference signal received power (RSRP). The first message can be one of a predefined set of messages. The relay device can be a user equipment (UE).

In some implementations, the method can include subdividing, by the relay device, a location, at which the plurality of requesting devices are located, into a plurality of location segments. The first requesting device and the second requesting device can be in a first location segment of the plurality of location segments. The method can include: transmitting, by the relay device based at least in part on a determination that a third message received from a third requesting device in a second location segment of the plurality of location segments has the high priority level, a second high priority response message to the third requesting device; and transmitting, by the relay device based at least in part on the determination that a fourth message received from a fourth requesting device in the second location segment does not have a high priority level, a second backoff message to the fourth requesting device.

In some implementations, generating the message can include identifying, based at least in part on the user input, a preidentified message of a plurality of preidentified messages. The high priority response message can include a request to establish an audio and/or visual communication link between the electronic device and the relay device. The message received from the relay device can be the high priority response message that includes a request for more information from the electronic device. The message received from the relay device can include an indication that the relay device sent another message to a remote system. The method can include determining whether the message received from the relay device can be a backoff message; and based at least in part on determining that the message received from the relay device can be a backoff message, initiating a timer with a duration that indicates a time for the electronic device to wait before transmitting the message to the relay device again.

The details of one or more implementations of these systems and methods are set forth in the accompanying drawings and the description below. Other features, objects, and advantages of these systems and methods will be apparent from the description and drawings, and from the claims.

DETAILED DESCRIPTION

Figure 1:
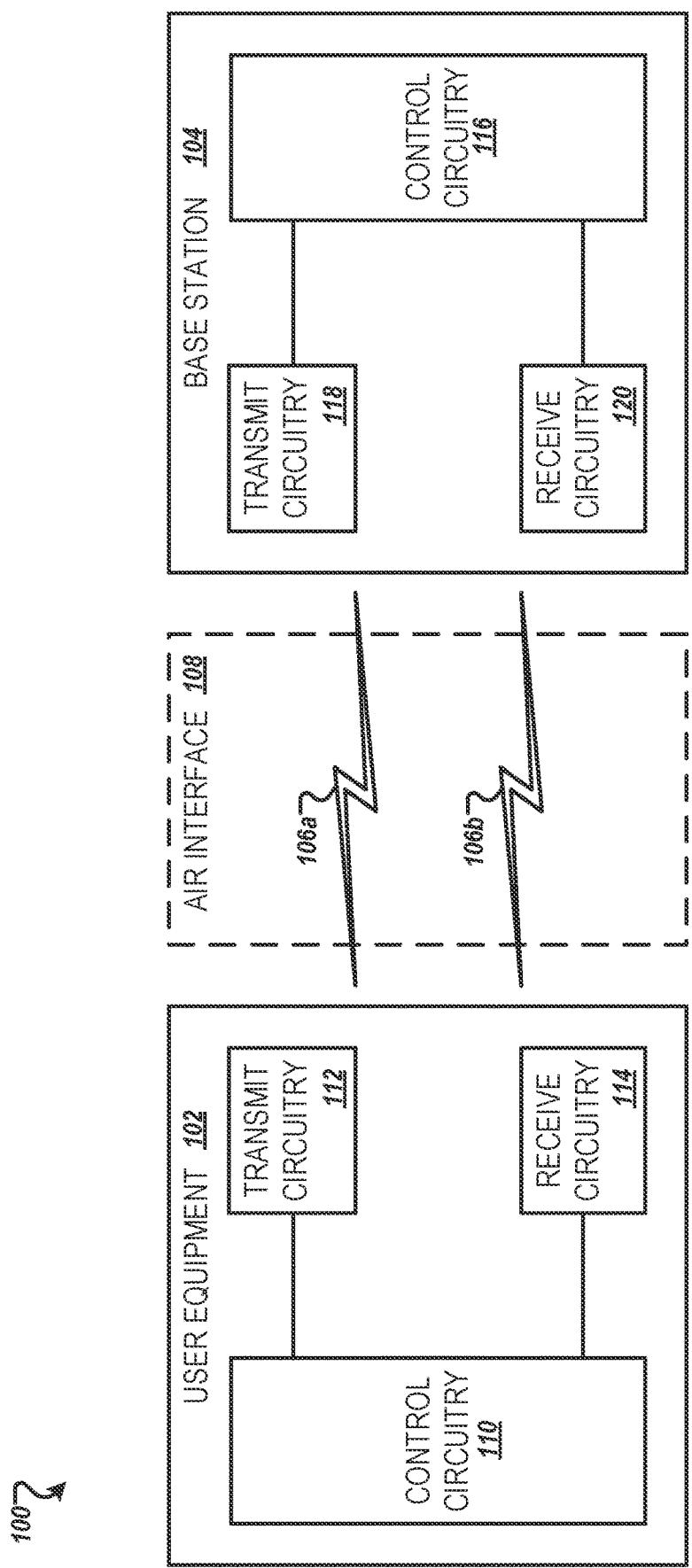
FIG. 1 illustrates an example wireless network, in accordance with some implementations.

In some situations, a device might not be able to connect, or might have difficulty connecting, with a terrestrial or non-terrestrial network to communicate, e.g., send data. For instance, the device might be in an area with limited or no network coverage. This can occur when the device is located in a sparsely populated area (e.g., wilderness or a large body of water), during an emergency (e.g., when a large number of devices are attempting to use the network), during a disaster (e.g., when some or all network equipment is out of service), and other such situations during which communication demand cannot be satisfied by communication infrastructure for at least a subset of devices.

To enable the device to send a message in such situations, a relay device can provide the device with a network connection. For instance, the relay device can receive a message from the device and forward the message to another device. The other device can include network equipment, e.g., a base station. The other device can include user equipment, e.g., a second user equipment when the relay device is a user equipment. The other device, the relay device, or both, can include a smart device, e.g., a smart camera, a tablet, or a smart watch.

When the situation, or multiple different situations, affect a large number of devices, the relay device might receive too many requests, e.g., from the device and other devices that do not have access, or have limited direct access, to a terrestrial or non-terrestrial network. This can cause the relay device to process requests more slowly than would otherwise occur, particularly when the relay device receives repeat requests from one or more of the devices.

To reduce an amount of network bandwidth used, an amount of computation resources used, or both, the relay device can determine which messages received from the various devices satisfy a priority threshold, e.g., have high or the highest priority. The relay device can process the messages that satisfy the priority threshold (e.g., high priority messages) while transmitting one or more backoff messages to the requesting devices from which the relay device received messages that did not satisfy the priority threshold (e.g., lower priority messages). The backoff message can cause (or request) a requesting device to wait until a time period expires before sending another message to the relay device. When processing the one or more messages that satisfy the priority threshold (e.g., the highest priority messages), the relay device can create a communication link between the relay device and the corresponding requesting device, forward the high priority message to a remote device, and/or perform another appropriate action. Further, the priority threshold can be adjusted over time, e.g., as the number and/or priority of the received requests changes. In some examples, the priority threshold can be based at least in part on a time when the message was received. In some examples, the priority threshold can be based at least in part on content included in the message.

FIG. 1 illustrates an example wireless network 100, in accordance with some implementations. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

For purposes of convenience and without limitation, the wireless network 100 is described in the context of Long Term Evolution (LTE) and Fifth Generation (5G) New Radio (NR) communication standards as defined by the Third Generation Partnership Project (3GPP) technical specifications. More specifically, the wireless network 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless network 100 may also be a Standalone (SA) network that incorporates only NR. Furthermore, other types of communication standards are possible, including future 3GPP systems (e.g., Sixth Generation (6G)) systems, Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; IEEE 802.11 ax; IEEE 802.11be; and/or other present or future developed IEEE 802.11 technologies), IEEE 802.16 protocols (e.g., WMAN, WiMAX, etc.), 802.15 protocols, or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, any/all of laptop computers, smartphones, tablet computers, machine-type devices such as smart meters or specialized devices for healthcare monitoring, remote security surveillance systems, intelligent transportation systems, or any other wireless devices with or without a user interface. In network 100, the base station 104 provides the UE 102 network connectivity to a broader network (not shown). This UE 102 connectivity is provided via the air interface 108 in a base station service area provided by the base station 104. In some implementations, such a broader network may be a wide area network operated by a cellular network provider, or may be the Internet. Each base station service area associated with the base station 104 is supported by antennas integrated with the base station 104. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may be adapted to perform operations associated with selection of codecs for communication and to adaption of codecs for wireless communications as part of system congestion control. The control circuitry 110 may include various combinations of application-specific circuitry and baseband circuitry. The transmit circuitry 112 and receive circuitry 114 may be adapted to transmit and receive data, respectively, and may include radio frequency (RF) circuitry or front-end module (FEM) circuitry, including communications using codecs as described herein.

The control circuitry 110 can perform various operations described in this specification. For instance, the control circuitry 110 can determine a priority of a message, generate a message, initiate a timer, determine whether a timer has expired, and/or a combination of two or more of these.

The transmit circuitry 112 can perform various operations described in this specification. For example, the transmit circuitry 112 can transmit messages to relay devices, transmit priority response messages (e.g., high priority response messages), transmit backoff messages, forward a message to a remote device or system, and/or a combination of two or more of these.

The receive circuitry 114 can perform various operations described in this specification. For instance, the receive circuitry 114 can receive messages from requesting devices, receive priority response messages (e.g., high priority response messages), receive backoff messages, and/or a combination of two or more of these.

In various implementations, aspects of the transmit circuitry 112, receive circuitry 114, and control circuitry 110 may be integrated in various ways to implement the circuitry described herein. The control circuitry 110 may be adapted or configured to perform various operations, such as those described elsewhere in this disclosure related to a UE. The transmit circuitry 112 may transmit a plurality of multiplexed uplink physical channels. The plurality of uplink physical channels may be multiplexed according to time division multiplexing (TDM) and/or frequency division multiplexing (FDM), along with carrier aggregation. The transmit circuitry 112 may be configured to receive block data from the control circuitry 110 for transmission across the air interface 108. Similarly, the receive circuitry 114 may receive a plurality of multiplexed downlink physical channels from the air interface 108 and relay the physical channels to the control circuitry 110. The plurality of downlink physical channels may be multiplexed according to TDM and/or FDM, along with carrier aggregation. The transmit circuitry 112 and the receive circuitry 114 may transmit and receive, respectively, both control data and content data (e.g., messages, images, video, etc.), e.g., structured within data blocks that are carried by the physical channels.

FIG. 1 also illustrates the base station 104, e.g., one implementation of a remote device. In some implementations, the base station 104 may be an NG radio access network (RAN) or a 5G RAN, an E-UTRAN, a non-terrestrial cell, or a legacy RAN, such as a UTRAN or GERAN. As used herein, the term "NG RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas (shared or dedicated) that may be used to enable communications via the air interface 108.

The control circuitry 116 may be adapted to perform operations for analyzing and selecting codecs, managing congestion control and bandwidth limitation communications from a base station, determining whether a base station is codec aware, and communicating with a codec-aware base station to manage codec selection for various communication operations described herein. The transmit circuitry 118 and receive circuitry 120 may be adapted to transmit and receive data, respectively, to/from a UE connected to the base station 104 using data generated with various codecs described herein.

In such implementations, the one or more channels 106A, 106B are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, an LTE-based access to unlicensed spectrum (LTE-U), a 5G protocol, a NR protocol, an NR-based access to unlicensed spectrum (NR-U) protocol, and/or any of the other communications protocols discussed herein. In some implementations, the UE 102 may directly exchange communication data via a ProSe interface. The ProSe interface may alternatively be referred to as a side link (SL) interface and may include one or more logical channels, including but not limited to a PSCCH, a PSSCH, a PSDCH, and a PSBCH.

Figure 2:
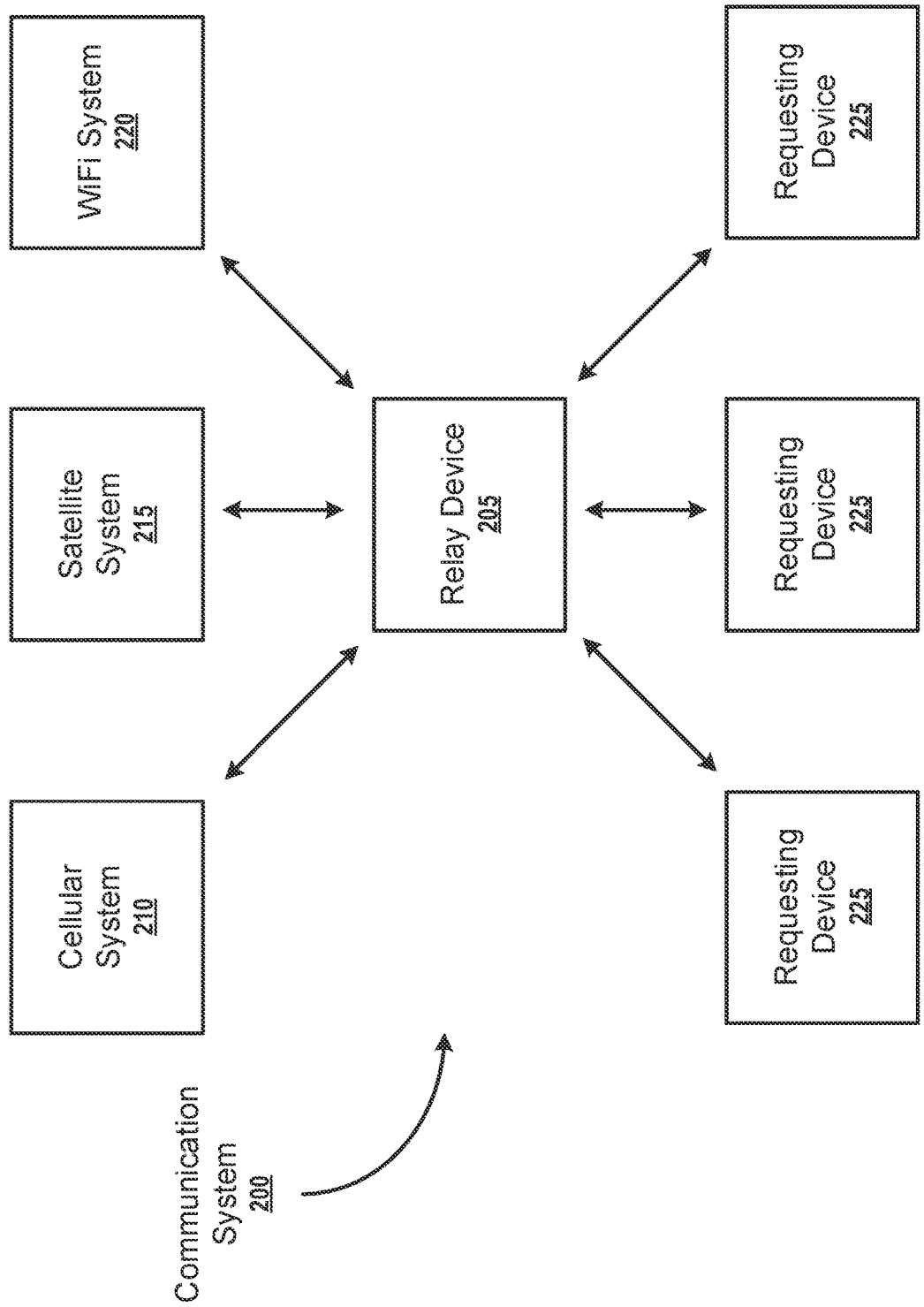
FIG. 2 depicts an example implementation of a wireless communication system, in accordance with various implementations.

FIG. 2 depicts an example implementation of a wireless communication system 200, in accordance with various implementations. The communication system 200 may include a relay device 205. The relay device may be, for example, a UE that is, includes, is included in, or is otherwise related to an electronic device such as electronic devices 200 or 300.

The relay device 205 may be communicatively coupled with one or more communication systems that are configured to allow the relay device 205 to send or receive messages, data, or information to another device or system that is remote from the relay device 205. Such communication systems may be or include a terrestrial system, e.g., a cellular system 210 or a WiFi system 220, a non-terrestrial system, e.g., a satellite system 215 or a high-altitude platform (HAP) system, or any combination of these. The cellular system 210 may be or include a 4G network, a 5G network, or some other network, e.g., as described above. Similarly, the WiFi system 220 may be similar to a WiFi system described above. It will be understood that these systems are non-exclusive, and may overlap (e.g., the relay device 205 may be communicatively coupled with the cellular system 210 through a WiFi system 220 and/or a satellite system 215).

The relay device 205 is further communicatively coupled with one or more requesting devices, such as requesting device(s) 225. Specifically, the relay device 205 and the requesting device(s) 225 may be communicatively coupled by a peer-to-peer communication protocol. The peer-to-peer communication protocol may include various channels, such as a synchronization channel, a control channel, a shared data channel, another appropriate type of channel, or a combination of two or more of these. Alternatively, a single channel can be used for multiple, or all, communications.

After synchronization between two or more devices is established, the devices can perform an authentication process via the control channel, and then the devices can exchange communication messages via the data channel.

In some implementations, a dedicated slot for message exchange, e.g., an emergency slot, may be added into an existing communication protocol and used for the communication described in this specification. In some implementations, the communication protocol may allow for connection of devices at distances up to 2 kilometers (km), while in other implementations the communication protocol may have greater or lesser distance capabilities (e.g., 1 km, 2.5 km, etc.).

Similarly to the relay device 205, the requesting device(s) 225 may each be, for example, a UE that is, includes, is included in, or is otherwise related to an electronic device such as electronic devices 200 or 300. In some implementations, there may be one or more intermediary devices (e.g., a router, a relay, or some other device) that is communicatively coupled between the relay device 205 and one or more of the one or more requesting devices 225. In some implementations, the requesting device(s) 225 may be of a same form factor as the relay device 205 (e.g., they may both be a cellular telephone), while in other implementations at least one of the requesting device(s) 225 may have a different form factor than the relay device 205 (e.g., the relay device 205 may be a cellular telephone while a requesting device 225 is a tablet). It will also be noted that although only three requesting devices 225 are depicted in FIG. 2, in other implementations the communication system 200 may include more or fewer requesting devices 225 that are communicatively coupled to the relay device 205.

Figure 3:
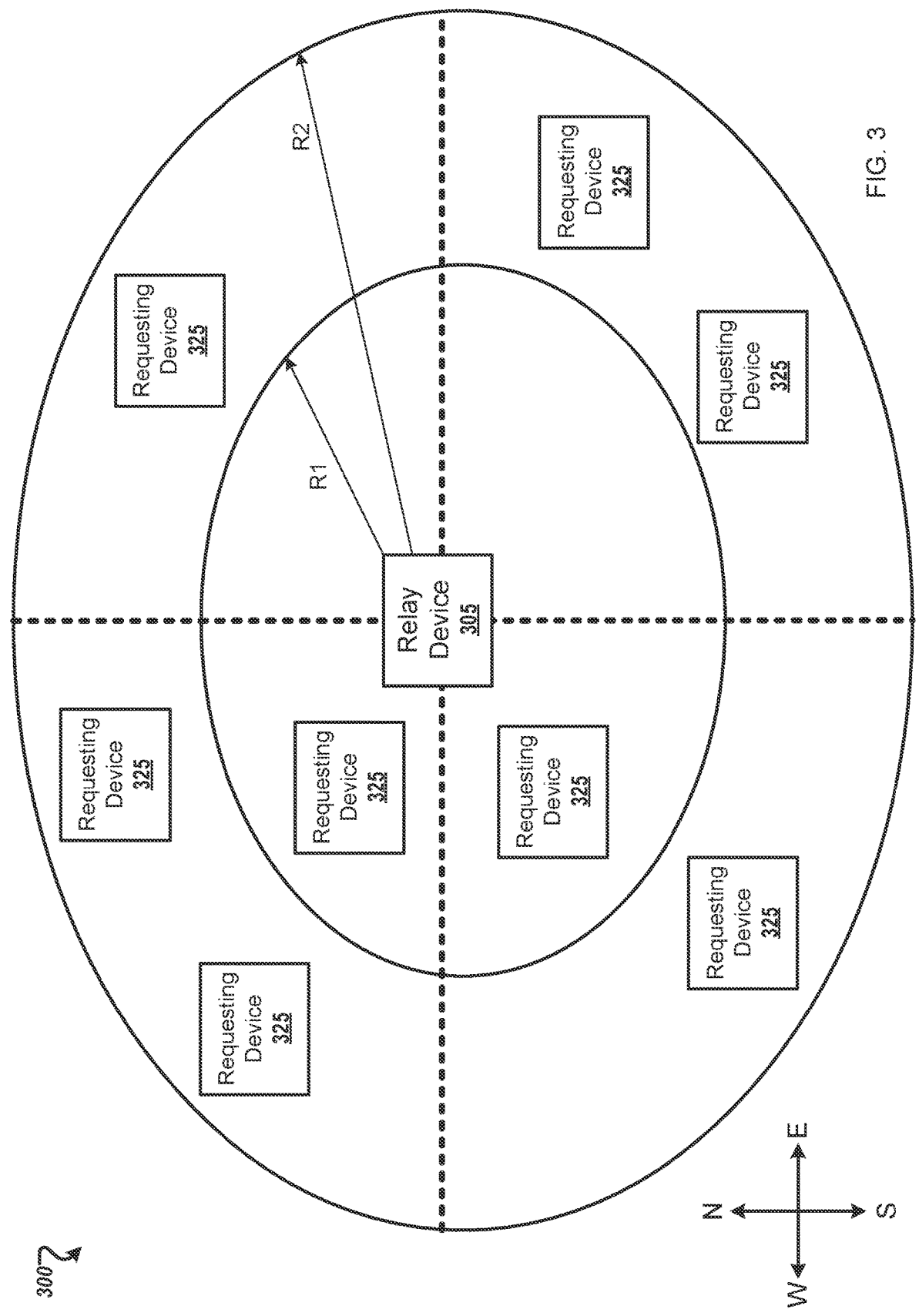
FIG. 3 depicts another example implementation of a communication system that includes requesting devices in relation to a relay device, in accordance with various implementations.

FIG. 3 depicts another example implementation of a communication system 300 that includes requesting devices 325 in relation to a relay device 305, in accordance with various implementations. The relay device 305 and requesting devices 325 may be similar to, and share one or more characteristics with, relay device 205 and requesting device(s) 225, respectively, of FIG. 2.

When an event arises, such as a disaster, individuals such as the users of the requesting device(s) 325 may seek to communicate. Accordingly, the requesting device(s) 325 may transmit a number of status messages, e.g., one or more status messages. Such status messages are generalized herein to two different types of status messages. The first type of status message is a SoS or "emergency" type message that includes a request for help or other assistance. The second type of status message is referred an "update" type message that is intended to indicate an update in status or another type of status message, but is not a request for help. Such messages may be, for example, when a user wishes to inform another person about their current location, that the user is safe or unharmed, or a combination of both.

As previously noted, in a disaster scenario, several requesting devices 325 (e.g., on the order of hundreds or thousands of devices) may be transmitting messages or other data generally concurrently, which may overload a conventional communication network (especially if such a network is damaged or otherwise affected by the disaster scenario) or a conventional communication network may not be available, at least for some requesting devices 325. In some implementations, the use of the relay device 305 as a central point of contact for the requesting device(s) 325 may be desirable, however such a situation may result in a significant delay to establish connection with the relay device 305 by a requesting device 325 due to congestion. Additionally, attempting to connect the relay device 305 to each requesting device 325 may quickly reduce the battery level of a relay device 305. Therefore, implementations herein relate to techniques to prioritize communications in a relay scenario, e.g., a disaster, such that the devices of the communication system 300 are served in a timely manner by the relay device 305.

Generally, implementations herein may include techniques to control congestion or overload at the relay device 305, reduce delay in the affected area, or both. At a high level, in some implementations, a requesting device 325 may transmit a status message as described above. The status message may include one or more data fields, such as content of the status message, an indication of a type of the status message (e.g., whether the message is an emergency type message or an update type message), an identifier for the requesting device, and data related to a location of the requesting device. The identifier may be, for example, a telephone number of the requesting device, an email address, a network identifier, a physical identifier of the requesting device 325, or some other type of identifier.

In some implementations, the status message may be one of a pre-defined set of status messages, and the content of the status message may include an indication of pre-defined content. In this case, the relay device 305 may compare the indication of the pre-defined content against a data structure, such as a look-up table, to identify the content of the status message. The use of a pre-defined set of status messages may be desirable to, for example, reduce the size or required bandwidth of the status message. In some implementations, the content of the status message may be based on user-entered content (e.g., a user-entered alphanumeric message or some other type of content).

The relay device 305 may then subdivide the affected area into two or more different segments, such as location segments. For example, FIG. 3 shows four different location segments that generally represent quadrants in accordance with the four cardinal directions of North, South, East, and West. These quadrants can include a northwest quadrant, a northeast quadrant, a southeast quadrant, and a southwest quadrant.

Additionally, in some implementations the area can be further subdivided, as shown by the concentric circles, e.g., based on range. In such implementations, the area may include requesting device(s) 325 that are within a first range of the relay device 305 (e.g., requesting devices 325 within the circle having a range R1) in a first set and include others of the requesting device(s) 325. (e.g., requesting devices 325 that are with the circle with the range R2, but outside of the circle with the range R1) in a second set. In some implementations, R1 may be on the order of one kilometer (km) and R2 is on the order of two km. Alternatively, or additionally, requesting devices 325 that are beyond a given range may be excluded.

However, it will be understood that the number of subdivisions, the number of ranges, the values for such ranges, how the subdivisions are oriented, or a combination of these, may be different in different implementations. For instance, the area can be subdivided based at least in part on factors such as the location of the relay device 305, the location(s) of the requesting device(s) 325, factors that are pre-defined or pre-stored on the relay device 305, some other factor or criteria, or a combination of two or more of these.

In some implementations, the relay device 305 may prioritize communication from one or more of the requesting devices 325 based on one or more criteria. One such criteria may be the message type. For example, emergency type messages may be given a higher priority than update type messages.

Another criteria may be location. For example, requesting devices 325 within range R1 may be given a higher priority than requesting devices 325 beyond range R1, e.g., because the signal strength (and thus efficiency of communication) between the relay device 305 and the requesting device 325 within range R1 may be greater than the signal strength between the relay device 305 and requesting devices outside of range R1.

In some implementations, the relay device 305 can prioritize at least some of the requesting devices 325 using signal strength and/or physical position of the requesting device 325, e.g., with respect to the relay device 305. In some implementations, the relay device 305 can prioritize the requesting devices 325 using whichever parameter is available first, such as the signal strength or the physical position. Further, the relay device 305 can modify the prioritization as other parameters for a requesting device 325, or other requesting devices 325, become available.

In some situations, e.g., when a very large number of devices are within the area of the communication system 300, it may be desirable to have a pre-prioritized list of devices, user identifiers, and/or accounts that correspond to the requesting devices, to assist with quickly and efficiently prioritizing the various status messages. One such list may include criteria such as a relationship of the requesting device 325, or the corresponding user to the relay device 305, or the corresponding user.

For example, one such efficient prioritization may include a recognition that a user's family group may be smaller than a user's friend group (e.g., a user's contact list), which may in turn be smaller than the group of all devices in the area of the communication system 300. Therefore, for the sake of efficient prioritization of status messages, the relay device 305 may prioritize status messages that include an identifier, such as one or more of the identifiers above, that is used to identify the relationship of the user of the requesting device 325 to the user of the relay device 305. However, it will be noted that, in some implementations, different relationships may be used to efficiently prioritize messages by the relay device 305. Some examples of different relationships can include those based on work events, those based on living situation (e.g., individuals in the same block, neighborhood, dormitory, apartment building, etc.), those based on extra-curricular activities, those based on pre-sorted emergency-related lists, such as those that may be operated by cities or states, etc.

In some implementations, a signal quality factor, such as reference signal received power (RSRP), reference signal received quality (RSRQ), or a combination of both, or some other signal quality factor that provides an indication of a quality of a signal between the relay device 305 and one or more of the requesting devices 325 may be used as a prioritization criteria. In some implementations, this factor may be used for all prioritization decisions by the relay device 305. In some implementations, the signal quality factor may be used as a "tie-breaker" or deciding factor, e.g., in the event that the one or more other factors in use do not sufficiently narrow the list of requesting devices 325 that are attempting to communicate with the relay device 305.

Based on the different prioritization criteria, the relay device 305 can identify messages received from various ones of the requesting devices 325 as having a higher priority than others of the messages. In some implementations, the relay device 305 can determine that the messages that have a higher priority satisfy a priority threshold. The priority threshold can indicate that a predetermined number of highest priority messages should be selected. In some implementations, the priority threshold can be a predetermined value, e.g., a numeric value. In these implementations, the relay device 305 can determine that the higher priority messages satisfy the priority threshold when the higher priority messages have corresponding priorities that are greater than, equal to, or greater than or equal to the predetermined priority threshold.

The relay device 305 can determine such a prioritization may by, at least in part, assigning different weights to different ones of the criteria. As a simplified example, using only the message type and the location parameters, the message type may have weights as shown in Table 1.

TABLE 1

| Message Type Prioritization Weights |
| --- |
| Emergency type = P1 |
| Update type = P2 |
| Other type = P3 |

The location type may have weights as shown in Table 2.

TABLE 2

| Location Type Prioritization Weights |
| --- |
| Location ≤ R1 = W1 |
| R1 < Location ≤ R2 = W2 |
| R2 < Location = W3 |

In this implementation, the prioritization calculation may be as follows, from highest priority to lowest priority: P1W1 (highest priority), P1W2, P2W1, P2W2, P1W3, . . . P3W3 (lowest priority).

It will be understood, however, that the above example is intended as one example of prioritization, and other implementations may be different. For example, in the above-shown example, message type is given greater consideration than location, which is why P1W2 is shown as having a higher priority than P2W1. However, in other implementations location may be given greater consideration. In some implementations, different ones of the weights may have a similar consideration (e.g., P1W2 may be given the same priority as P2W1), or one or more additional/alternative factors may be used, such as the signal quality factor described above.

In some implementations, instead of or in addition to prioritizing messages, the relay device 305 can prioritize requesting devices 325. For example, the relay device 305 can determine a priority for a particular requesting device 325 based at least in part on the messages the relay device 305 received from the particular requesting device 325. This can occur when the relay device 305 waits to prioritize messages until a period of time has passed, e.g., when the priority threshold indicates the predetermined number of highest priority messages that should be selected. In these examples, the relay device 305 can receive multiple messages from the particular requesting device 325 and determine a priority for the particular requesting device 325 based at least in part on the multiple messages. For instance, the relay device 305 can determine a priority for each of the multiple messages and then determine a priority for the particular requesting device 325 based at least in part on the priorities for the multiple messages.

In some implementations, the relay device 305 may serve those requesting devices 325 with messages that have higher priorities before serving others of the requesting devices 325 with messages that have lower priorities. For example, the relay device 305 may transmit a high priority emergency response message to the requesting device(s) 325 with the highest priority, while sending a "backoff message" to requesting device(s) 325 with a lower priority.

The high priority emergency response message may include a request for two-way communication, a request for establishment of an audio channel, a request for establishment of a video channel, a request for more information, an indication that an emergency service (e.g., police, search and rescue, fire department, medical services, etc.) has been contacted, some other message, or a combination of two or more of these. In response to sending a request for more information, the relay device 305 can receive additional information from a corresponding requesting device 325. The relay device 305 can use the additional information to determine a priority for a device, a priority for a request message, or both. In addition to sending the higher priority emergency response message, the relay device 305 may contact one or more of the above-listed emergency services on behalf of the higher-priority requesting device 325 prior to establishment of the two-way communication.

The backoff message may include, for example, an indication of a backoff timer, which is to be used by the requesting device 325 prior to re-attempting communication with the relay device 305. When the lower priority requesting device 325 receives the backoff timer, e.g., a message that indicates a duration for the backoff timer, the lower priority requesting device 325 can initiate a timer indicated by the duration. When the lower priority requesting device 325 determines that the timer has expired, the lower priority requesting device 325 can re-attempt communication with the relay device 305, e.g., can send another message to the relay device 305. The other message can be the same message the lower priority requesting device 325 previously sent to the relay device 305 or a different message. In some implementations, the lower priority requesting device 325 can re-attempt communication with a different relay device, e.g., when the lower priority requesting device 325 determines that the other relay device has a better connection with the lower priority requesting device 325 than the relay device 305. In some implementations, the backoff message may further include an indication, e.g., that the relay device 305 has contacted an emergency service, as described above.

The relay device 305 can identify any appropriate number of requesting devices 325 as having a higher priority. In some implementations, the relay device 305 may identify only a single requesting device 325 as having a higher priority. In some implementations, the relay device 305 may identify a single requesting device 325 per subdivision (e.g., per quadrant) or multiple requesting devices 325 per subdivision as having a higher priority. In such implementations, the relay device 305 may establish a higher-priority communication with multiple ones of the requesting devices 325 (e.g., one requesting device 325 per subdivision). The number of requesting devices 325 identified as having a higher priority may be based on a criteria, such as bandwidth of the relay device 305, the number of subdivisions, the number of requesting devices, a predetermined quantity, a combination of two or more of these factors, or one or more other factors.

In some implementations, for example where a single requesting device 325 per subdivision is identified as having a higher priority, that requesting device 325 may take on one or more of the functions of a relay device, such as relay device 305, for one or more other requesting devices 325 in that subdivision. In this way, network load may be shared between different ones of the devices, and overall network traffic may be significantly reduced.

Figure 4:
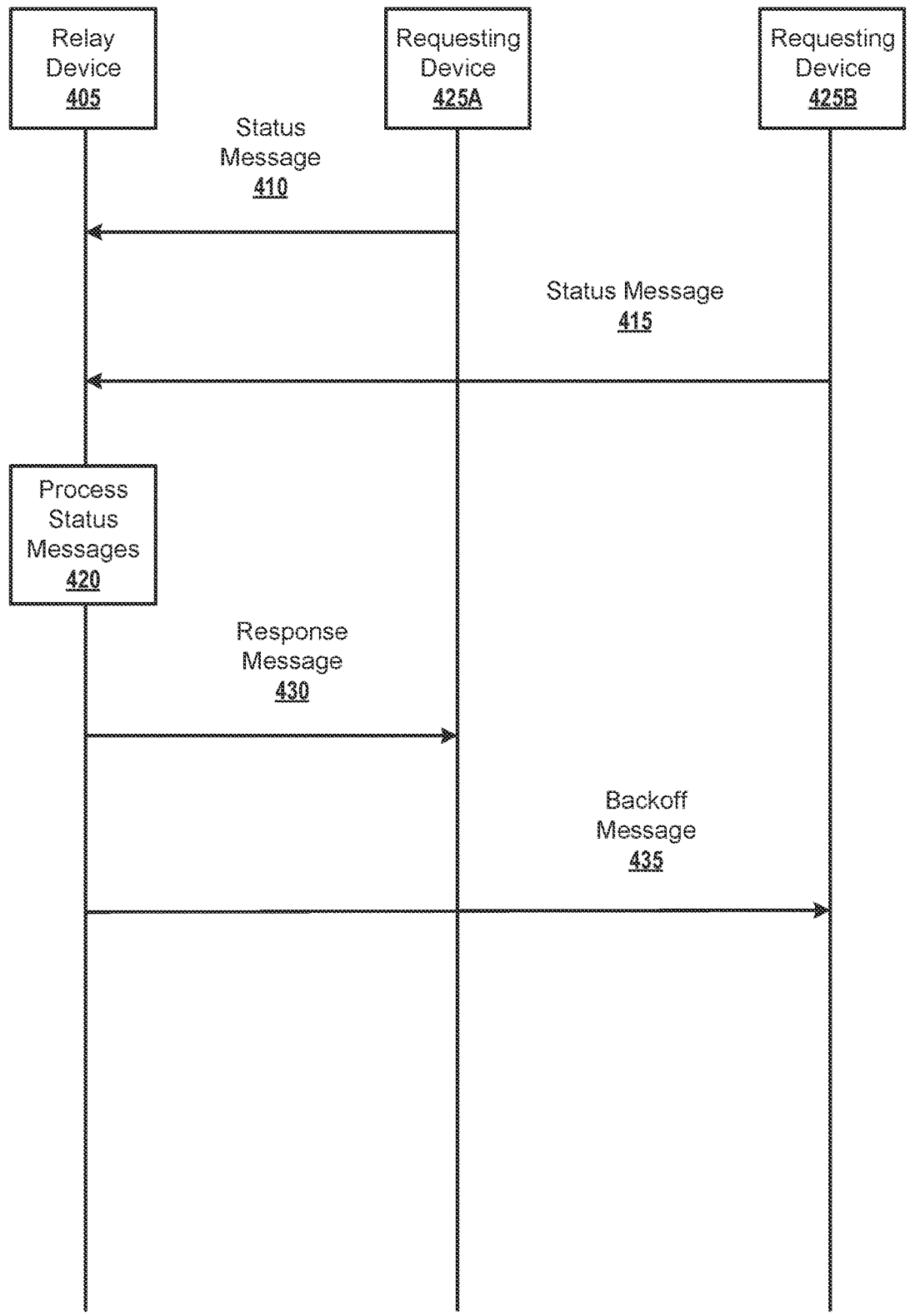
FIG. 4 depicts an example process flow, in accordance with various implementations.

FIG. 4 depicts an example process flow 400, in accordance with various implementations. As shown in FIG. 4, the process flow 400 may include communication between a relay device 405, a requesting device 425A, and a requesting device 425B. In some implementations, the relay device 405 may be similar to relay device 205 and/or relay device 305, and the requesting devices 425A/425B may be similar to requesting devices 225 and/or requesting devices 325. It will be understood that this example is intended as a highly simplified example showing communication between two requesting devices and a relay device. In other implementations, there may be more requesting devices, e.g., on the order of tens, hundreds, or thousands of requesting devices. Therefore, this process may be scaled appropriately, such that it is repeated for requesting devices in different subdivisions of the area as described above.

As shown in FIG. 4, requesting device 425A may transmit a status message to the relay device 405 at 410. Similarly, the requesting device 425B may transmit a status message to the relay device 405 at 415. In some implementations, the status messages at 410 and 415 may be similar to the status messages described above. Although the examples described here refer to status messages, other appropriate types of messages can be used in similar processes, by the relay device 405 and the requesting devices 425A-B. For instance, the requesting device 425A can transmit a request message to the relay device 405 at 410 and the requesting device 425B can transmit a text message, e.g., a status message or another appropriate type of message, to the relay device 405 at 415.

The relay device 405 may process the status messages at 420. In some implementations, processing the status messages may include identifying the priorities of the different status messages as described above. Processing the status messages may additionally or alternatively include performing one or more other actions based on the status message(s), such as contacting an emergency service, establishing subdivisions, etc. as described above.

Based at least in part on the processing of the status messages at 420, the relay device 405 may transmit a high priority emergency response message and/or a backoff message to one or more of the requesting devices, as described above. For example, in the implementation depicted in FIG. 4, the status message received from a first requesting device 425A at 410 is identified as a higher priority status message than the status message received from a second requesting device 425B. As a result, the relay device 405 may transmit a higher priority emergency response message at 430 to the first requesting device 425A as shown. The status message received from the second requesting device 425B at 415 may be identified as being of a lower priority, and the relay device 405 may transmit a backoff message at 435 to the second requesting device 425B.

It will be understood that the implementations described above and herein are intended as example implementations, and other implementations may vary. For example, there may additional priority levels than the "higher" and "lower" levels described herein. Additionally, the terms "higher" and "lower" are intended to describe priority levels that are relative to one another for the sake of discussion herein. Additionally, although the transmission of certain messages such as those at 410/415 and 430/435 are depicted as being sequential, in other implementations one or more of the messages may be transmitted in a different order than shown, concurrently, or at least partially overlapping in time with one another.

In some implementations, the relay device 405 can determine that two or more messages have the same priority, and that priority is the highest priority at least presently being processed. In these implementations, the relay device 405 can determine to send an emergency response message (or other affirmative response message) to each of the two or more requesting devices 425 associated with the two or more messages that have the same priority. Further, the relay device 405 can send the response message to the two or more requesting devices 425 substantially concurrently (e.g., as a broadcast), serially (e.g., as unicast), or using any other available transmission scheme.

In some implementations, the relay device 405 can identify as higher priority messages two or more messages that have different priorities. For instance, when the relay device 405 has a parameter that indicates a predetermined quantity of requesting devices for which the corresponding message should be processed, e.g., to which response messages should be sent or for which the corresponding message should be forwarded or both, the relay device 405 can select the predetermined quantity of requesting devices that have the highest priority messages compared to other messages received. The relay device 405 can then process the predetermined quantity of highest priority messages. In other implementations, other prioritization schemes can be used. For instance, the relay device can identify as higher priority all received messages that exceed one or more thresholds. The thresholds can be any appropriate threshold, such as a time threshold, a ranking threshold, etc. Further, the relay device 405 can further differentiate messages within a prioritization class, such as by acting on one or more higher priority messages while sending a shorter back-off (or other delay) message to one or more devices associated with other higher priority messages.

In some implementations, the relay device 405 can forward messages using a time at which the messages were received. For instance, the relay device 405 can forward one or more first messages received within a first time period while responding with backoff messages for one or more second messages received within a second time period. In some examples, the relay device can perform this operation using one or more additional thresholds.

Figure 5:
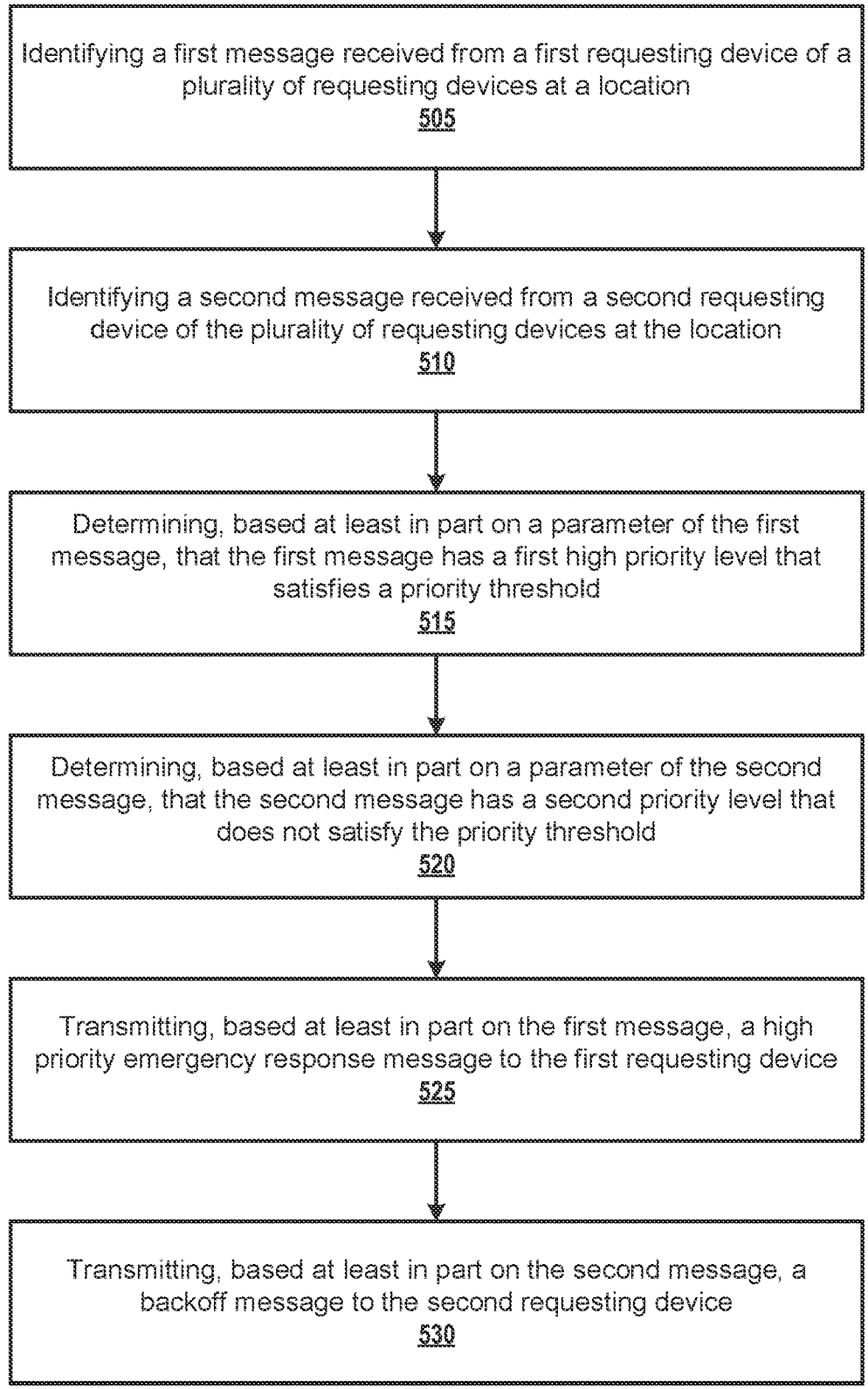
FIG. 5 depicts an example technique to be performed by a relay device, in accordance with various implementations.

FIG. 5 depicts an example technique 500 to be performed by a relay device. The relay device can be a device such as relay device 205 or can be some other relay device, in accordance with various implementations.

The technique 500 may include identifying, at 505, a first message received from a first requesting device of a plurality of requesting devices at a location. In some implementations, the first message can be related to an emergency situation or other event at the location. In some implementations, the location can be a geographic area, such as a park, a campus, a city, a town, or another appropriate location. In some other implementations, the location can be associated with a communication range, such as an effective range over which device-to-device or peer-to-peer communications (or other such mesh communications) can be conveyed.

The technique 500 may further include identifying, at 510, a second message from a second requesting device of the plurality of requesting devices at the location. In some examples, the second message also can be related to an emergency situation, e.g., at a second location when it is the same emergency situation or at the location. In some other examples, the first message and the second message can be related to different situations or events.

The requesting devices may be similar to, for example, requesting devices 425A/425B, or can be any other device(s) suitable for requesting relay communications as described herein. The message(s) may be similar to, for example, the status messages described above with respect to elements 410 or 415, or the status message(s) can be implemented using any other message format appropriate for relay communications.

The technique 500 may further include determining, at 515, based at least in part on a parameter of the first message, that the first message has a first high priority level that satisfies a priority threshold. The first priority level can be a high priority level.

The technique 500 may further include determining, at 520, based at least on a parameter of the second message, that the second message has a second priority level that does not satisfy the priority threshold. The second priority level is different from the first priority level. The second priority level can be a low priority level, a medium priority level, etc. that is lower than the first, higher priority level. The parameter may be or include, for example, any/all of a location of the requesting device, a device identifier, an identity of the user of the requesting device, a signal quality parameter, a type of the message, or some other parameter as described above.

The technique 500 may further include transmitting, at 525 based at least on the first message, a high priority emergency response message to the first requesting device. The transmission can be based at least in part on the determination that the first priority level satisfies the priority threshold.

In some implementations, the technique 500 can include transmitting the high priority emergency response message to the first requesting device based on a determination that the first message has the highest priority level. The high priority emergency response message may be similar to, for example, the high priority emergency response message described above with respect to element 430.

The technique 500 may further include transmitting, at 530 based at least on the second message, a backoff message to the second requesting device. The transmission can be based at least in part on the determination that the second priority level does not satisfy the priority threshold.

In some implementations, the technique 500 can include transmitting the backoff message to the second requesting device based at least on a determination that the second message has a lower priority level than the highest priority level. Such a backoff message may be similar to, for example, the backoff message described above with respect to element 435. In some implementations, the high priority level can be determined relative to the messages received over a given period. For example, in the absence of a higher priority level message being received during a window of time, a message with an intermediate priority can be deemed a high priority (or highest priority) message.

Figure 6:
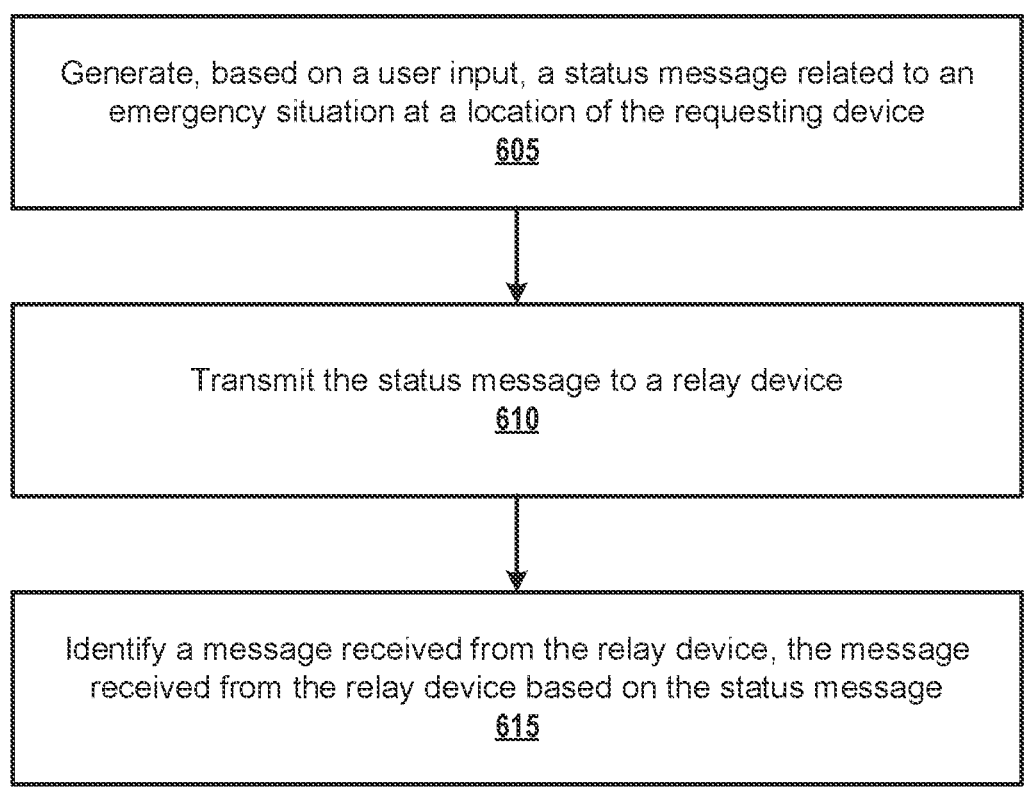
FIG. 6 depicts an example technique to be performed by a requesting device, in accordance with various implementations.

FIG. 6 depicts an example technique 600 to be performed by a requesting device, such as one of requesting devices 425A, 425B, or some other requesting device discussed herein, in accordance with various implementations.

The technique 600 may include generating, at 605, based on a user input, a message related to an event, e.g., an emergency situation, at a location of the requesting device. In some implementations, the message may be similar to those discussed above, e.g., with respect to elements 410 or 415. In other implementations the message may have any other suitable format. As discussed above, the message may be generated based on selection of a pre-defined message, through custom input (e.g., text, image, voice, etc.), through a combination thereof, or through some other input.

The technique 600 may further include transmitting, at 610, the message to a relay device, such as relay device 405. Such a transmission may occur by way of any wireless communication technique, including cellular (e.g., 3GPP), WiFi (e.g., 802.11), Bluetooth, UWB, or other such communication technique/protocol, or through a combination of two or more of these.

The technique 600 may further include identifying, at 615, a message received from the relay device, e.g., in response to the message transmitted at 610. The received message may be a high priority emergency response message, a backoff message, an acknowledgement (ACK) message, or any other such message.

It will be understood that the techniques 500 and 600 described above, and other techniques or processes discussed or described herein, are intended as example techniques and may vary in other implementations. For example, other techniques may have more or fewer elements than are depicted herein, elements that occur in a different order than depicted (e.g. the sequence of occurrence may be different, or elements may occur at least partially concurrently with one another), etc. Other variations may be present.

Figure 7:
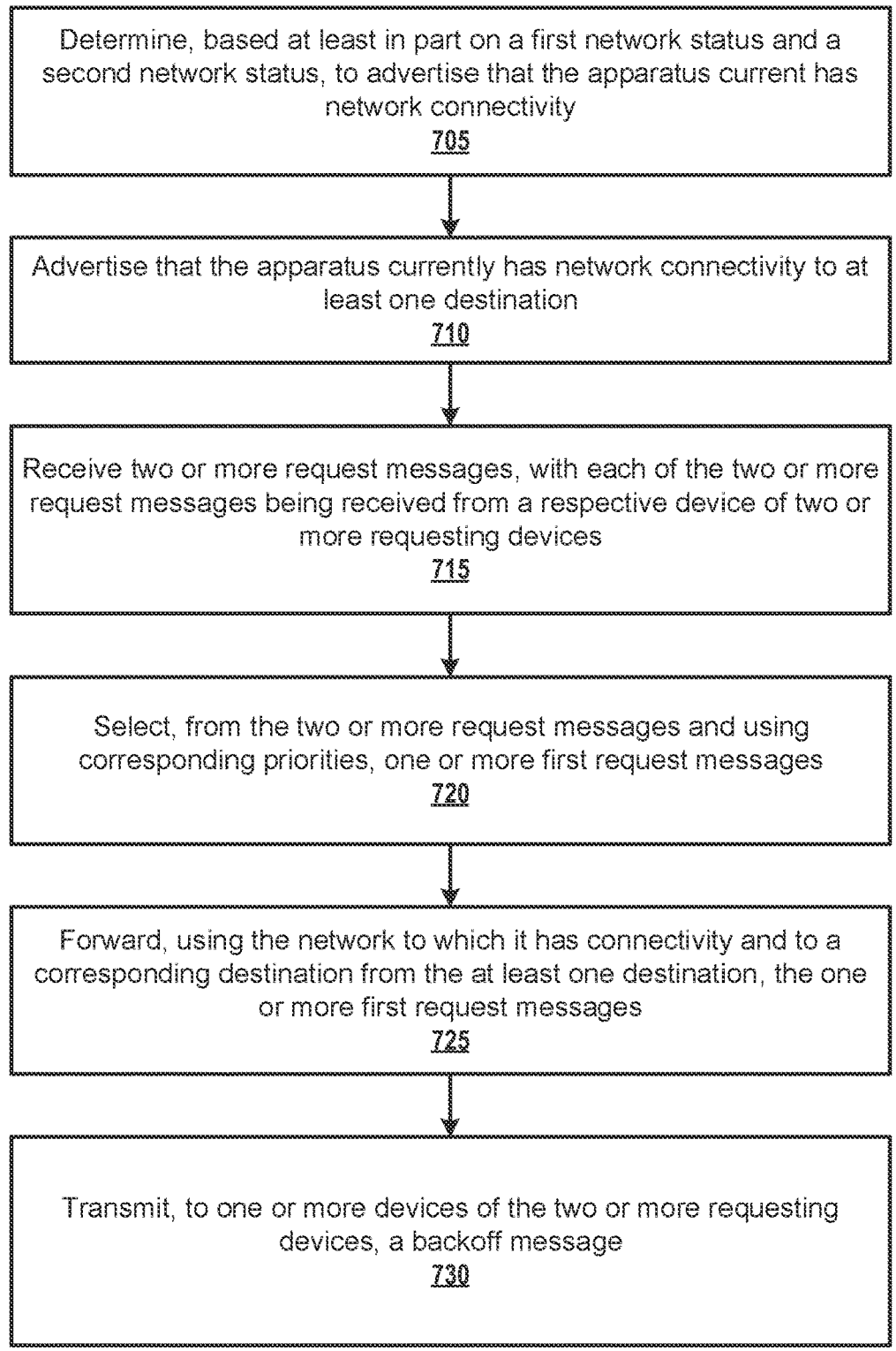
FIG. 7 is a flow diagram of an example process for selectively forwarding messages.

FIG. 7 is a flow diagram of an example process 700 for selectively forwarding messages. For example, the process 700 can be used by the relay device 205, the relay device 305, or the relay device 405. In some examples, the process 700 can be used by a processor, e.g., a baseband processor.

A relay device determines, based at least in part on a first network status and a second network status, to advertise that the apparatus current has network connectivity (705). The first network status can be of the relay device. The second network status can be of the relay device or another device, e.g., a requesting device. The relay device can determine the status of another device by receiving a message from the other device or inferring, e.g., using data received from a third party system, a network connectivity status of the other device based at least in part on data the relay device receives. The data the relay device receives can include an alert, an advertisement, a status indicator, news data, etc., that indicates that one or more devices, e.g., in an area within a threshold distance from the relay device, do not have network connectivity.

The relay device advertises that the apparatus currently has network connectivity to at least one destination (710). For instance, the relay device can transmit, e.g., broadcast, a message that indicates that the relay device has network connectivity. The connectivity confirmation can be sent in response to any appropriate trigger, such as determining that one or more neighboring devices do not have network connectivity. Separately or in conjunction with the connectivity notification, the relay device can notify any/all of the compatible devices within a range, e.g., an effective communication range, a threshold range, a predetermine range, etc., that it can act as a relay device. In some instances, the relay device can communicate with neighboring devices using an interface other than the interface associated with the network type for which other devices do not have network connectivity. For instance, if the relay device determines that another device likely does not have terrestrial network connectivity, while the relay device has non-terrestrial network connectivity, the relay device can transmit the advertisement using a short range communication protocol, e.g., Bluetooth or WiFi. Alternatively, the relay device can communicate with neighboring devices using the same interface. For example, the relay device can use cellular device-to-device (D2D) communication when neighboring devices do not, or likely do not, have cellular network connectivity.

The relay device can receive two or more request messages, with each of the two or more request messages being received from a respective device of two or more requesting devices (715). In some examples, the relay device can receive a first relay request from a first device and a second relay request from a second device. For example, following an advertisement or other notification sent by the relay device, the relay device can receive two or more request messages, e.g., requesting communication relay. In some instances, the relay device can receive multiple messages at substantially the same time or within the same time window. In other instances, the relay device can receive messages at different times. In some instances, the two or more requesting devices might not include the at least one destination with which the apparatus currently has network connectivity.

The relay device selects, from the two or more request messages and using corresponding priorities, one or more first request messages (720). The relay device can determine respective priority levels for the two or more request messages, and/or for corresponding devices from which the relay device received the two or more request messages. The relay device can use the respective priority levels, at least in part, to select the one or more first request messages.

The relay device can select the first request messages at any appropriate time. In some implementations, the relay device selects the first request messages as the first request messages are received from corresponding requesting devices. In some implementations, the relay device can select the first request messages after expiration of a time period. In some instances, the time period can begin upon the earliest receipt of the two or more request messages.

The relay device forwards, using the network to which it has connectivity and to a corresponding destination from the at least one destination, the one or more first request messages (725). For instance, the relay device may forward, using the connection to the second network, a message associated with the first relay request.

The relay device may have a connection to a non-terrestrial network, and the relay device can use that non-terrestrial network to forward the one or more first request messages, e.g., to another communication network, the Internet, etc. The relay device can determine an intended destination for a request message based at least in part on data associated with the request message, e.g., such as included in a field of the request message header or payload.

The relay device transmits, to one or more devices of the two or more requesting devices, a backoff message (730). For instance, the relay device may transmit, to the second device, a backoff message. A second request message of the one or more second request messages can be received from a device in the one or more devices of the two or more requesting devices. For example, in some implementations, the relay device can broadcast the backoff message addressed to devices in the one or more devices.

In some examples, after forwarding the one or more first messages, the relay device can transmit a second backoff message to the devices from which the relay device received the one or more first request messages. In some implementations, the second backoff message can include an instruction for the recipient device to back off, e.g., for a time period or until the relay device sends another message allowing for subsequent communications. The time period can be the same as, or have a different length than, a second time period in the backoff message sent to the subset of devices. The first time period in a backoff message sent to the devices from which the first request messages were received can have a longer time, a shorter time period, or the same time period as the period indicated as the second time period.

The order of operations in the process 700 described above is illustrative only, and selectively forwarding messages can be performed in different orders. For example, the relay device can perform operation 720, at least in part, before performing one or both of operations 705 and 710. This can occur when the relay device receives a first request message and uses, at least in part, data from the first request message to determine the second network status of a device from which the first request message was received. In some implementations, the relay device can perform operations 725 and 730 substantially concurrently or such that they at least partially overlap in time. In some implementations, the relay device can perform operation 730 and then operation 725.

In some implementations, the process 700 can include additional operations, fewer operations, or some of the operations can be divided into multiple operations. For example, the relay device can perform operations 710 through 725; operations 710 through 720 and operation 730; without performing the other operations in the process 700. In some examples, the process 700 can include identifying an event disrupting connectivity to a first network. The process 700 can include determining that the apparatus has a connection to a second network. The process 700 can include transmitting a message indicating to one or more neighboring devices that the apparatus has network connectivity, e.g., instead of advertising the message.

The examples described in this specification can relate to other types of situations, messages, or both. For instance, although some examples are described with respect to a relay device receiving, or a requesting device sending, a status message, other implementations can use other types of messages. For example, in some implementations, the message can be a non-status message, such as a non-status text message or email.

Although some examples are described with reference to emergency situations, the devices described in this specification and use the described operations in other types of situations. For instance, a device can send a message when the device has limited or no connectivity with a wireless network but is able to transmit data to another device, e.g., another UE.

Figure 8:
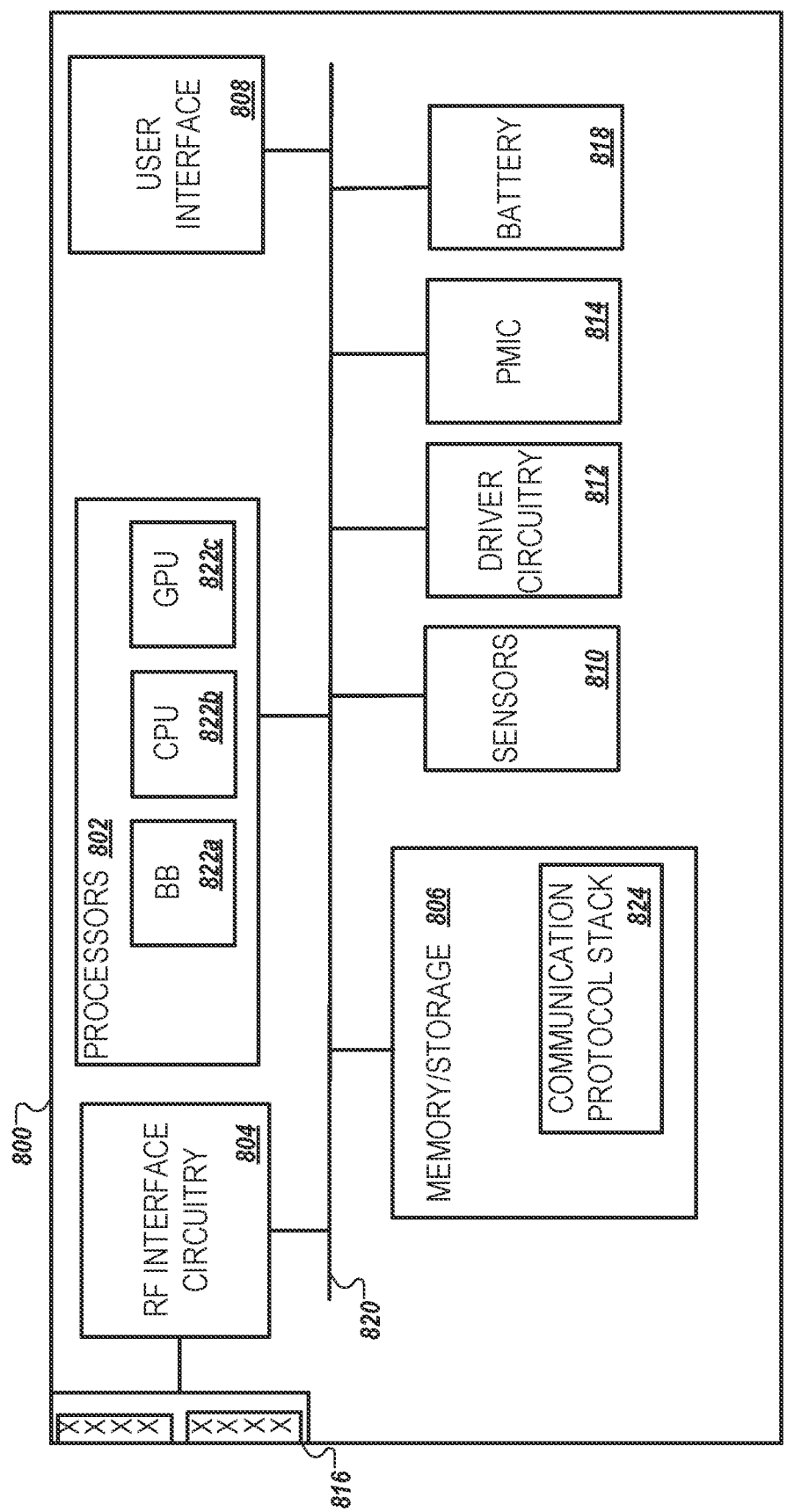
FIG. 8 illustrates a user equipment (UE), in accordance with some implementations.

FIG. 8 illustrates a UE 800, in accordance with some implementations. The UE 800 may be similar to and substantially interchangeable with UE 102 of FIG. 1.

The UE 800 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 800 may include processors 802, RF interface circuitry 804, memory/storage 806, user interface 808, sensors 810, driver circuitry 812, power management integrated circuit (PMIC) 814, antenna structure 816, and battery 818. The components of the UE 800 may be implemented as integrated circuits (ICs), portions thereof, discrete electronic devices, or other modules, logic, hardware, software, firmware, or a combination thereof. The block diagram of FIG. 7 is intended to show a high-level view of some of the components of the UE 800. However, some of the components shown may be omitted, additional components may be present, and different arrangement of the components shown may occur in other implementations.

The components of the UE 800 may be coupled with various other components over one or more interconnects 820, which may represent any type of interface, input/output, bus (local, system, or expansion), transmission line, trace, optical connection, etc. that allows various circuit components (on common or different chips or chipsets) to interact with one another.

The processors 802 may include processor circuitry such as, for example, baseband processor circuitry (BB) 822A, central processor unit circuitry (CPU) 822B, and graphics processor unit circuitry (GPU) 822C. The processors 802 may include any type of circuitry or processor circuitry that executes or otherwise operates computer-executable instructions, such as program code, software modules, or functional processes from memory/storage 806 to cause the UE 800 to perform operations as described herein.

In some implementations, the baseband processor circuitry 822A may access a communication protocol stack 824 in the memory/storage 806 to communicate over a 3GPP compatible network. In general, the baseband processor circuitry 822A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 804. The baseband processor circuitry 822A may generate or process baseband signals or waveforms that carry information in 3GPP-compatible networks. In some implementations, the waveforms for NR may be based cyclic prefix OFDM "CP-OFDM" in the uplink or downlink, and discrete Fourier transform spread OFDM "DFT-S-OFDM" in the uplink.

The memory/storage 806 may include one or more non-transitory, computer-readable media that includes instructions (for example, communication protocol stack 824) that may be executed by one or more of the processors 802 to cause the UE 800 to perform various operations described herein. The memory/storage 806 include any type of volatile or non-volatile memory that may be distributed throughout the UE 800. In some implementations, some of the memory/storage 806 may be located on the processors 802 themselves (for example, L1 and L2 cache), while other memory/storage 806 is external to the processors 802 but accessible thereto via a memory interface. The memory/storage 806 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 804 may include transceiver circuitry and radio frequency front module (RFEM) that allows the UE 800 to communicate with other devices over a radio access network. The RF interface circuitry 804 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 816 and proceed to filter and amplify (with a low-noise amplifier) the signal. The signal may be provided to a receiver of the transceiver that downconverts the RF signal into a baseband signal that is provided to the baseband processor of the processors 802.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 816.

In various implementations, the RF interface circuitry 804 may be configured to transmit/receive signals in a manner compatible with NR access technologies.

The antenna 816 may include antenna elements to convert electrical signals into radio waves to travel through the air and to convert received radio waves into electrical signals. The antenna elements may be arranged into one or more antenna panels. The antenna 816 may have antenna panels that are omnidirectional, directional, or a combination thereof to enable beamforming and multiple input, multiple output communications. The antenna 816 may include microstrip antennas, printed antennas fabricated on the surface of one or more printed circuit boards, patch antennas, phased array antennas, etc. The antenna 816 may have one or more panels designed for specific frequency bands including bands in FR1 or FR2.

The user interface 808 includes various input/output (I/O) devices designed to enable user interaction with the UE 800. The user interface 808 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 800.

The driver circuitry 812 may include software and hardware elements that operate to control particular devices that are embedded in the UE 800, attached to the UE 800, or otherwise communicatively coupled with the UE 800. The driver circuitry 812 may include individual drivers allowing other components to interact with or control various input/output (I/O) devices that may be present within, or connected to, the UE 800. For example, driver circuitry 812 may include a display driver to control and allow access to a display device, a touchscreen driver to control and allow access to a touchscreen interface, sensor drivers to obtain sensor readings of sensor circuitry 728 and control and allow access to sensor circuitry 728, drivers to obtain actuator positions of electro-mechanic components or control and allow access to the electro-mechanic components, a camera driver to control and allow access to an embedded image capture device, audio drivers to control and allow access to one or more audio devices.

The PMIC 814 may manage power provided to various components of the UE 800. In particular, with respect to the processors 802, the PMIC 814 may control power-source selection, voltage scaling, battery charging, or DC-to-DC conversion.

In some implementations, the PMIC 814 may control, or otherwise be part of, various power saving mechanisms of the UE 800 including DRX as discussed herein. A battery 818 may power the UE 800, although in some examples the UE 800 may be mounted deployed in a fixed location, and may have a power supply coupled to an electrical grid. The battery 818 may be a lithium ion battery, a metal-air battery, such as a zinc-air battery, an aluminum-air battery, a lithium-air battery, and the like. In some implementations, such as in vehicle-based applications, the battery 818 may be a typical lead-acid automotive battery.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

For one or more implementations, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES OF VARIOUS IMPLEMENTATIONS

Example 1 includes a method comprising: identifying, by a relay device, a first message received from a first requesting device of a plurality of requesting devices; identifying, by the relay device, a second message received from a second requesting device of the plurality of requesting devices; determining, by the relay device based at least in part on a parameter of the first message, that the first message has a first priority level that satisfies a priority threshold; determining, by the relay device based at least in part on a parameter of the second message, that the second message has a second priority level that does not satisfy the priority threshold; transmitting a relay message to a remote device based at least in part on the first message; and transmitting a backoff message to the second requesting device.

Example 2 includes the method of example 1, wherein the remote device is associated with an emergency service.

Example 3 includes the method of any of examples 1-2, further comprising transmitting, by the relay device, a response message to the first requesting device.

Example 4 includes the method of example 3, wherein the response message includes a request to establish a communication link between the relay device and the first requesting device.

Example 5 includes the method of any of examples 3-4, wherein the response message includes a request for additional information.

Example 6 includes the method of any of examples 3-5, wherein the response message includes an indication that the relay device sent a message to the remote device.

Example 7 includes the method of any of examples 1-6, wherein the backoff message indicates a duration for the second requesting device to wait before transmitting another message to the relay device.

Example 8 includes the method of any of examples 1-7, wherein the parameter of the first message is at least one of a message type of the first message, an identity of a user of the first requesting device, an indication of a proximity of the first requesting device to the relay device, or a signal quality parameter associated with the first requesting device.

Example 9 includes the method of example 8, wherein the signal quality parameter is reference signal received power (RSRP).

Example 10 includes the method of any of examples 1-9, wherein the first status message is one of a predefined set of status messages.

Example 11 includes the method of any of examples 1-10, wherein the relay device comprises a user equipment (UE).

Example 12 includes the method of any of examples 1-11, further comprising logically subdividing, by the relay device, a location at which the plurality of requesting devices are located, into a plurality of location segments.

Example 13 includes the method of example 12, wherein the first requesting device and the second requesting device are in a first location segment of the plurality of location segments, and wherein the method further comprises: transmitting, by the relay device based at least in part on a determination that a third message received from a third requesting device in a second location segment of the plurality of location segments has a third priority level that satisfies the priority threshold, a second response message to the third requesting device; and transmitting, by the relay device based at least in part on the determination that a fourth message received from a fourth requesting device in the second location segment has a fourth priority level that does not satisfy the priority threshold, a second backoff message to the fourth requesting device.

Example 14 includes the method of any of examples 1-13, wherein the first emergency situation is the same emergency situation as the second emergency situation.

Example 15 includes a method comprising: generating, by a requesting device based at least in part on a user input, a status message related to an emergency situation at a location of the requesting device; transmitting, by the requesting device, the status message to a relay device; and identifying, by the requesting device based at least in part on the status message, a message received from the relay device; wherein: the message received from the relay device is a high priority emergency response message if the relay device determines that the status message has a high priority level; or the message received from the relay device is a backoff message if the relay device determines that the status message has a priority level that is different than a high priority level.

Example 16 includes the method of example 15, wherein the priority level of the status message is based at least in part on at least one of a message type of the status message, an identity of a user of the requesting device, a proximity of the requesting device to the relay device, and a signal quality parameter of the requesting device.

Example 17 includes the method of any of examples 15 or 16, wherein generating the status message comprises identifying, by the requesting device based at least in part on the user input, a preidentified status message of a plurality of preidentified status messages.

Example 18 includes the method of any of examples 15-17, wherein the high priority emergency response message includes a request to establish an audio, visual, or both, communication link between the requesting device and the relay device.

Example 19 includes the method of any of examples 15-18, wherein the message received from the relay device is the high priority emergency response message that includes a request for more information from the requesting device.

Example 20 includes the method of any of examples 15-19, wherein the message received from the relay device comprises an indication that the relay device sent another message to an emergency services system.

Example 21 includes the method of any of examples 15-20, further comprising determining, by the requesting device, whether the message received from the relay device is a backoff message; and based at least in part on determining that the message received from the relay device is a backoff message, initiating a timer with a duration that indicates a time for the requesting device to wait before transmitting the status message to the relay device again Example 22 includes the method of any of examples 15-21, wherein the backoff message includes an indication of a duration until the requesting device can transmit another status message to the relay device.

Example 23 includes the method of any of examples 15-22, wherein the requesting device comprises a UE.

Example 24 includes a method comprising: advertising that an apparatus has network connectivity to at least one destination; receiving two or more request messages, each of the two or more request messages received from a corresponding device of two or more requesting devices that does not include the at least one destination, wherein the two or more request messages comprises one or more first request messages and one or more second request messages; selecting, from the two or more request messages and using corresponding priorities, the one or more first request messages; forwarding, using the network connectivity and to a corresponding destination from the at least one destination, the one or more first request messages; and transmitting, to each device in a subset of devices from the two or more requesting devices, a backoff message, wherein each second request message from the one or more second request messages was received from a device in the subset of devices.

Example 25 includes the method of example 24, comprising determining, based at least in part on a first network status of the apparatus and a second network status, to advertise that the apparatus current has network connectivity.

Example 26 includes the method of example 25, comprising: determining, as the first network status of the apparatus, that the apparatus has a connection to a first type of network; and determining, as the second network status of the apparatus, that the apparatus does not have a connection to a second, different type of network.

Example 27 includes the method of any of examples 24-26, wherein selecting the one or more first request messages comprises: selecting one message from the one or more first request messages at a first time within a threshold time period of receipt of the one message; and selecting another message from the one or more first request messages at a second time after the first time within the threshold time period of receipt of the other message, wherein the first time and the second time are different times.

Example 28 includes the method of any of examples 24-27, receiving the two or more request messages comprises receiving the two or more request messages over a time period; selecting the one or more first request messages comprises: determining that the time period has elapsed after receipt of an earliest received message from the two or more request messages; and selecting, from the two or more request messages and basted at least in part on the determination that the time period has elapsed, the one or more first request messages.

Example 29 includes the method of any of examples 24-28, wherein transmitting the backoff message comprises broadcasting, to the devices in the subset of devices, the backoff message.

Example 30 includes the method of any of examples 24-29, wherein selecting the one or more first request messages comprises: determining, for at least some requesting devices of the two or more requesting devices, a corresponding priority; and selecting, based at least in part on the corresponding priorities of the requesting device from which the request message was received, the one or more first request messages.

Example 31 includes the method of any of examples 24-30, comprising after forwarding the one or more first request messages, transmitting, to at least one requesting device from which the apparatus received a corresponding first request message from the one or more first request messages, an acknowledgement message instructing the corresponding requesting device to back off for a first time period, wherein the backoff message instructs the corresponding device in the subset of devices to back off for a second time period that is shorter than the first time period.

Example 32 includes a method comprising identifying an event disrupting connectivity to a first network; determining, for an apparatus, that the apparatus has a connection to a second network; transmitting a message indicating to one or more neighboring devices that the apparatus has network connectivity; receiving a first relay request from a first device and a second relay request from a second device; forwarding, using the connection to the second network, a message associated with the first relay request; and transmitting, to the second device, a backoff message.

Example 33 includes the method of example 32, comprising: determining, based at least in part on identifying the event disrupting connectivity to the first network and determining that the apparatus has a connection to the second network, to transmit the message indicating that the apparatus has network connectivity, wherein transmitting the message is based at least in part on determining to transmit the message.

Example 34 includes the method of example 33, wherein: the first network comprises a first type of network; and the second network comprises a second, different type of network.

Example 35 includes the method of any of examples 32-34, wherein identifying the event disrupting connectivity to the first network comprises determining that the apparatus lost a connection with the first network.

Example 36 includes the method of any of examples 32-35, wherein identifying the event disrupting connectivity to the first network comprises receiving, from a third party system, data that indicates the disruption to connectivity to the first network.

Example 37 includes the method of any of examples 32-36, wherein: receiving the first relay request and the second relay request comprises: receiving, from the first device, the first relay request at a first time; and receiving, from the second device, the second relay request at a second time that is after the first time; forwarding the message associated with the first relay request is responsive to determining that the first time satisfies a time threshold; and transmitting, to the second device, the backoff message is responsive to determining that the second time does not satisfy the time threshold.

Example 38 includes the method of any of examples 32-37, wherein transmitting the backoff message comprises broadcasting, to a plurality of second devices that includes the second device, the backoff message.

Example 39 includes the method of any of examples 32-38, wherein: forwarding the message associated with the first relay request is responsive to determining that a first priority for the first relay request satisfies a priority threshold; and transmitting, to the second device, the backoff message is responsive to determining that a second priority for the second relay request does not satisfy the priority threshold.

Example 40 includes the method of any of examples 32-39, comprising, after forwarding the message, transmitting, to the first device, an acknowledgement message instructing the first device to back off for a first time period, wherein the backoff message instructs the second device to back off for a second time period that is shorter than the first time period.

Example 41 includes an apparatus comprising means to perform the method of any of examples 1-40.

Example 42 includes one or more non-transitory computer-readable media comprising instructions that, upon execution of the instructions by one or more processors of an electronic device, are to cause the electronic device to perform the method of any of examples 1-40.

Example 43 includes an electronic device comprising: one or more processors; and one or more non-transitory computer-readable media comprising instructions that, upon execution of the instructions by one or more processors of an electronic device, are to cause the electronic device to perform the method of any of examples 1-40.

Example 44 includes an apparatus configured to perform one or more of the disclosed operations.

Example 45 includes a system as described herein for performing one or more of the disclosed operations.

A system, e.g., a base station, an apparatus including one or more baseband processors, and so forth, can be configured to perform particular operations or actions by virtue of having software, firmware, hardware, or a combination of them installed on the system that in operation causes or cause the system to perform the actions. The operations or actions performed either by the system can include the methods of any one of examples 1-40 or the other examples described throughout this specification.

Any of the above-described examples may be combined with any other example (or combination of examples), unless explicitly stated otherwise. The foregoing description of one or more implementations provides illustration and description, but is not intended to be exhaustive or to limit the scope of implementations to the precise form disclosed. Modifications and variations are possible in light of the above teachings or may be acquired from practice of various implementations.

Although the implementations above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method comprising:
   receiving, by a relay device that transmits one or more relay messages for other devices and using a first peer-to-peer communication protocol, a first message from a first requesting device of a plurality of requesting devices;
   receiving, by the relay device and using a second peer-to-peer communication protocol, a second message from a second requesting device of the plurality of requesting devices, wherein the plurality of requesting devices that includes the first requesting device and the second requesting device does not include the relay device;
   determining, by the relay device based at least in part on a first parameter of the first message, that the first message has a first priority level that satisfies a priority threshold;
   determining, by the relay device based at least in part on a second parameter of the second message, that the second message has a second priority level that does not satisfy the priority threshold;
   in response to determining that the first message received from the first requesting device has a first priority level that satisfies the priority threshold, transmitting a relay message to a remote device based at least in part on the first message, wherein the remote device is a different device than the first requesting device; and
   in response to determining that the second message received from the second requesting device has the second priority level that does not satisfy the priority threshold, transmitting a backoff message to the second requesting device using the second peer-to-peer communication protocol.

2. The method of claim 1, comprising, in response to determining that the first message has a first priority level that satisfies the priority threshold, transmitting, by the relay device, a response message to the first requesting device, wherein the response message is a different type of message than the backoff message.

3. The method of claim 2, wherein transmitting the response message comprises transmitting, by the relay device and to the first requesting device, the response message that includes a request to establish a communication link between the relay device and the first requesting device.

4. The method of claim 2, wherein transmitting the response message comprises transmitting, by the relay device and to the first requesting device, the response message that includes a request for additional information.

5. The method of claim 2, wherein transmitting the response message comprises transmitting, by the relay device and to the first requesting device, the response message that includes an indication that the relay device sent a message to the remote device.

6. The method of claim 1, wherein:
   the remote device is associated with an emergency service; and
   determining that the first message has the first priority level that satisfies the priority threshold comprises determining that the first message includes data that indicates that the first message is an emergency message.

7. The method of claim 1, wherein transmitting the backoff message comprises transmitting, by the relay device and to the second requesting device using the second peer-to-peer communication protocol, the backoff message that indicates a duration for the second requesting device to wait before transmitting another message to the relay device.

8. The method of claim 1, wherein receiving the first message comprises receiving, by the relay device, the first message a) received from a first requesting device and b) that includes the parameter of the first message is at least one of a message type of the first message, an identity of a user of the first requesting device, an indication of a proximity of the first requesting device to the relay device, or a signal quality parameter associated with the first requesting device.

9. The method of claim 8, wherein the signal quality parameter comprises a reference signal received power (RSRP) value.

10. The method of claim 1, comprising maintaining data that identifies a set of predefined messages,
    wherein determining that the first message has the first priority level that satisfies the priority threshold comprises determining that the first message is a message included in the set of predefined messages.

11. The method of claim 1, further comprising logically subdividing, by the relay device, a location at which the plurality of requesting devices are located, into a plurality of location segments including a first location for the first requesting device and a second location for the second requesting device, wherein:
    determining that the first message has the first priority level that satisfies the priority threshold uses the first location for the first requesting device, or determining that the second message has the second priority level that does not satisfy the priority threshold uses the second location for the second requesting device.

12. The method of claim 11, wherein the first requesting device and the second requesting device are in a first location segment of the plurality of location segments, and wherein the method further comprises:
   transmitting, by the relay device based at least in part on a determination that a third message received from a third requesting device in a second location segment of the plurality of location segments has a third priority level that satisfies the priority threshold, a second response message to the third requesting device; and
   transmitting, by the relay device based at least in part on the determination that a fourth message received from a fourth requesting device in the second location segment has a fourth priority level that does not satisfy the priority threshold, a second backoff message to the fourth requesting device.

13. An apparatus comprising processing circuitry and memory on which are stored instructions that are operable, when executed by the processing circuitry, to cause the processing circuitry to perform operations comprising:
   receiving, for a relay device that transmits one or more relay messages for other devices and using a first peer-to-peer communication protocol, a first message from a first requesting device of a plurality of requesting devices;
   receiving, for the relay device and using a second peer-to-peer communication protocol, a second message from a second requesting device of the plurality of requesting devices, wherein the plurality of requesting devices that includes the first requesting device and the second requesting device does not include the relay device;
   determining, for the relay device based at least in part on a first parameter of the first message, that the first message has a first priority level that satisfies a priority threshold;
   determining, for the relay device based at least in part on a second parameter of the second message, that the second message has a second priority level that does not satisfy the priority threshold;
   in response to determining that the first message received from the first requesting device has a first priority level that satisfies the priority threshold, transmitting a relay message to a remote device based at least in part on the first message, wherein the remote device is a different device than the first requesting device; and
   in response to determining that the second message received from the second requesting device has the second priority level that does not satisfy the priority threshold, transmitting a backoff message to the second requesting device using the second peer-to-peer communication protocol.

14. The apparatus of claim 13, wherein:
   the remote device is associated with an emergency service; and
   determining that the first message has the first priority level that satisfies the priority threshold comprises determining that the first message includes data that indicates that the first message is an emergency message.

15. The apparatus of claim 13, the operations comprising, in response to determining that the first message has a first priority level that satisfies the priority threshold, transmitting, by the relay device, a response message to the first requesting device, wherein the response message is a different type of message than the backoff message.

16. The apparatus of claim 15, wherein transmitting the response message comprises transmitting, by the relay device and to the first requesting device, the response message that includes a request to establish a communication link between the relay device and the first requesting device.

17. The apparatus of claim 15, wherein transmitting the response message comprises transmitting, by the relay device and to the first requesting device, the response message that includes a request for additional information.

18. The apparatus of claim 15, wherein transmitting the response message comprises transmitting, by the relay device and to the first requesting device, the response message that includes an indication that the relay device sent a message to the remote device.

19. The apparatus of claim 13, wherein transmitting the backoff message comprises transmitting, by the relay device and to the second requesting device using the second peer-to-peer communication protocol, the backoff message that indicates a duration for the second requesting device to wait before transmitting another message to the relay device.

20. One or more non-transitory computer storage media encoded with instructions that, when executed by processing circuitry, cause the processing circuitry one or more computers to perform operations comprising:
   receiving, for a relay device that transmits one or more relay messages for other devices and using a first peer-to-peer communication protocol, a first message from a first requesting device of a plurality of requesting devices;
   receiving, for the relay device and using a second peer-to-peer communication protocol, a second message from a second requesting device of the plurality of requesting devices, wherein the plurality of requesting devices that includes the first requesting device and the second requesting device does not include the relay device;
   determining, for the relay device based at least in part on a parameter of the first message, that the first message has a first priority level that satisfies a priority threshold;
   determining, for the relay device based at least in part on a parameter of the second message, that the second message has a second priority level that does not satisfy the priority threshold;
   in response to determining that the first message received from the first requesting device has a first priority level that satisfies the priority threshold, transmitting a relay message to a remote device based at least in part on the first message, wherein the remote device is a different device than the first requesting device; and
   in response to determining that the second message received from the second requesting device has the second priority level that does not satisfy the priority threshold, transmitting a backoff message to the second requesting device using the second peer-to-peer communication protocol.

21. The media of claim 20, wherein the first requesting device or the second requesting device does not have a cellular network connection.

22. The media of claim 20, wherein the first requesting device or the second requesting device does not have a terrestrial network connection.

* * * * *

UNITED STATES PATENT AND TRADEMARK OFFICE
CERTIFICATE OF CORRECTION

PATENT NO. : 12,452,762 B2
APPLICATION NO. : 17/879023
DATED : October 21, 2025
INVENTOR(S) : Badic et al.

Page 1 of 1

It is certified that error appears in the above-identified patent and that said Letters Patent is hereby corrected as shown below:

In the Claims

Column 28, Line 27-28, In Claim 20, after "circuitry" delete "one or more computers".

Signed and Sealed this
Ninth Day of December, 2025

John A. Squires
*Director of the United States Patent and Trademark Office*